(12) United States Patent
Herbert

(10) Patent No.: US 11,756,023 B2
(45) Date of Patent: Sep. 12, 2023

(54) PAYMENT DEVICE AND PROCESS

(71) Applicant: International Business Machines Corporation, Armonk, NY (US)

(72) Inventor: Lindsay Herbert, London (GB)

(73) Assignee: International Business Machines Corporation, Armonk, NY (US)

(*) Notice: Subject to any disclaimer, the term of this patent is extended or adjusted under 35 U.S.C. 154(b) by 96 days.

(21) Appl. No.: 16/762,160

(22) PCT Filed: Nov. 30, 2018

(86) PCT No.: PCT/IB2018/059517
§ 371 (c)(1),
(2) Date: May 7, 2020

(87) PCT Pub. No.: WO2019/111119
PCT Pub. Date: Jun. 13, 2019

(65) Prior Publication Data
US 2020/0364692 A1 Nov. 19, 2020

(30) Foreign Application Priority Data
Dec. 8, 2017 (GB) .................................. 1720497

(51) Int. Cl.
*G06Q 20/32* (2012.01)
*G01R 33/07* (2006.01)
*G06Q 20/40* (2012.01)

(52) U.S. Cl.
CPC .......... *G06Q 20/327* (2013.01); *G01R 33/07* (2013.01); *G06Q 20/3223* (2013.01); *G06Q 20/4014* (2013.01)

(58) Field of Classification Search
CPC ............. G06Q 20/327; G06Q 20/3223; G06Q 20/4014; G06Q 20/3278; G01R 33/07;
(Continued)

(56) References Cited

U.S. PATENT DOCUMENTS 8,516,599 B2  8/2013  Morita
10,034,268 B1 * 7/2018  Hazlewood ............. H04W 4/02
(Continued)

FOREIGN PATENT DOCUMENTS

CN   101859465 A   10/2010
CN   104272332 A   1/2015
(Continued)

OTHER PUBLICATIONS

"A probabilistic framework for multi-sensor fusion based indoor localization on mobile platform", Xiang He, Jul. 11, 2017, Oakland University Dissertation (Year: 2017).*
(Continued)

*Primary Examiner* — Neha Patel
*Assistant Examiner* — Duan Zhang
(74) *Attorney, Agent, or Firm* — Eric W. Chesley

(57) ABSTRACT

A method for receiving and executing a request from an electronic communications device in a point-of-sale location, the device configured to receive, from a device reader, magnetic signature data from a magnetic field produced by the device reader and wirelessly receiving a reader unique identifier from the device reader. The device configured to communicate the magnetic signature data and unique identifier to a backend service as reader identifying data together with customer credentials. The backend service configured to match customer credentials with a customer database, and match reader identifying data to a reader database to verify the reader identify; the backend service configured to use verified reader identity to identify order data received from a terminal and to pass order data to a payment provider for executing payment.

6 Claims, 10 Drawing Sheets

(58) Field of Classification Search
CPC .... G01R 33/02; G07G 1/009; G06F 21/6209; G06F 21/44
See application file for complete search history.

(56) References Cited

U.S. PATENT DOCUMENTS

| | | | | |
|---|---|---|---|---|
| 10,459,103 | B1 * | 10/2019 | Shi | G01V 3/08 |
| 2012/0095853 | A1 | 4/2012 | Von Bose | |
| 2012/0284427 | A1 * | 11/2012 | Dods | G06F 1/1626 710/62 |
| 2015/0088617 | A1 * | 3/2015 | Geist | G06Q 20/28 705/13 |
| 2015/0186874 | A1 * | 7/2015 | Govindarajan | G06Q 20/322 705/65 |
| 2016/0012426 | A1 * | 1/2016 | Chitilian | G06Q 20/3278 705/44 |
| 2016/0300217 | A1 | 10/2016 | Grabovski | |
| 2017/0169402 | A1 | 6/2017 | Atikoglu | |

FOREIGN PATENT DOCUMENTS

| | | | | |
|---|---|---|---|---|
| CN | 105051779 A | * | 11/2015 | G06F 8/65 |
| CN | 105493116 A | | 4/2016 | |
| CN | 107194689 A | * | 9/2017 | |
| CN | 107209974 A | | 9/2017 | |
| JP | 2006004264 A | | 1/2006 | |
| JP | 2010244329 A | | 10/2010 | |
| JP | 2015506046 A | | 2/2015 | |
| JP | 2017532631 A | | 11/2017 | |
| KR | 101773924 B | | 9/2017 | |
| KR | 101773924 B1 | * | 9/2017 | |
| WO | 2011119612 A2 | | 9/2011 | |
| WO | 2013096486 A1 | | 6/2013 | |
| WO | 2016023152 A1 | | 2/2016 | |
| WO | 2016094581 A1 | | 6/2016 | |
| WO | 2019111119 A1 | | 6/2019 | |

OTHER PUBLICATIONS

"Amazon Go," Amazon.com, accessed May 4, 2020, 4 pages. <https://www.amazon.com/b?node=16008589011#>.

"QR Payments," tpay.com, accessed May 6, 2020, 2 pages. <https://tpay.com/dla-biznesu/metody-platnosci/platnosci-qr>.

"We are experts in location and proximity solutions," Estimote.com, accessed May 4, 2020, 6 pages. <https://estimote.com/>.

"What is Near Field Communication?" Near Field Communication, accessed May 4, 2020, 2 pages. <http://nearfieldcommunication.org/>.

International Search Report and Written Opinion dated Mar. 20, 2019, for International Application No. PCT/IB2018/059517, filed Nov. 30, 2018.

Mell et al., "The NIST Definition of Cloud Computing," Recommendations of the National Institute of Standards and Technology, U.S. Department of Commerce, Special Publication 800-145, Sep. 2011, 7 pages.

"Notice of Reasons for Refusal", Application No. Japanese Patent Application No. 2020527888, Date of Drafting: Apr. 26, 2022, 3 pgs.

"Notice of Reasons for Refusal", Application No. Japanese Patent Application No. 2020527888, dated Oct. 21, 2022, 4 PGS.

* cited by examiner

PAYMENT DEVICE AND PROCESS

BACKGROUND

In a retail environment, such as a retail store, it is desirable to facilitate rapid payment for a customer at the point of sale.

One exemplary payment method uses 'contactless' payment via Near-Field Communication (NFC) technology. NFC payment is achieved through a customer's NFC enabled payment card or mobile device (e.g. mobile phone/cellphone, smart watch, tablet computer etc.) exchanging data with a store's NFC reader.

With NFC, peer-to-peer transmission of data is employed. This means the card or mobile device used by the customer both sends and receives data. This is what allows NFC to work in areas with no wireless local area network or mobile data signal.

A customer's 'contactless' credit or debit card may be used to facilitate NFC payment directly between the customer's bank or credit card company and the store. In another example, NFC payment may be facilitated through an intermediary payment provider. The customer's mobile device is equipped with an NFC chip, and when authorized by the customer (e.g. via fingerprint ID), the chip sends and receives data when touched near an NFC payment device.

Another exemplary method for in-store payment is to display a unique image (e.g. a matrix barcode) on the customer's mobile device and scan it by a reader at the point of sale. Alternatively, the point of sale terminal may display the image to be scanned by a customer's camera-enabled smart device that is running an application capable of interpreting the image and matching it with the customer's account and payment details. These are stored within the application or hosted in a cloud computing environment. In one example, a unique image on a customer's smart device is scanned by a scanner at an entrance barrier at an enabled store.

Once scanned, the customer is identified, the barrier opens, and a combination of technologies is used to track the customer and what goods they pick up in the store so that payment is taken from their account automatically when they walk out with their purchased goods.

SUMMARY

In accordance with a first aspect of the disclosure, there is provided an electronic communications device for use by a retail customer comprising: a processor; a memory; a magnetic field sensor; a wireless transceiver; and a device payment application stored in the memory and operable for executing by the processor; the device being operable for wireless communicating with a device reader of a point-of-sale location and with a payment system; the device reader comprising: an electromagnetic component for producing a magnetic field and operable for detecting close-range interaction with that field by the magnetic field sensor of the device and thereby detecting the device; and a wireless sender/receiver component for communicating with the electromagnetic component and for wireless communicating with the wireless transceiver of the device; the device reader being operable for communicating with a retail terminal of the point-of-sale location and having a unique identifier; the terminal comprising: processing functionality operable for identifying items presented for purchase and for communicating this as order data to the payment system; the device operable for executing a payment process for the purchase of an item presented at the point-of-sale location by the customer, the payment process comprising: presenting the device to the device reader so that the reader electromagnetic component detects the device; device payment application receiving data on magnetic field interaction from the device magnetic sensor; device transceiver receiving unique identifier from reader in response to the presenting and communicating it to device payment application; device payment application wireless communicating received magnetic sensor data and reader unique identifier as reader identifying data together with customer identifying credentials to payment system; payment system using customer credentials and reader identifying data to verify the reader identity; payment system identifying order data received from terminal using verified reader identity and passing identified order data to a payment provider for executing payment.

In accordance with further aspects, there are provided methods, system and computer programs according to the independent claims.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
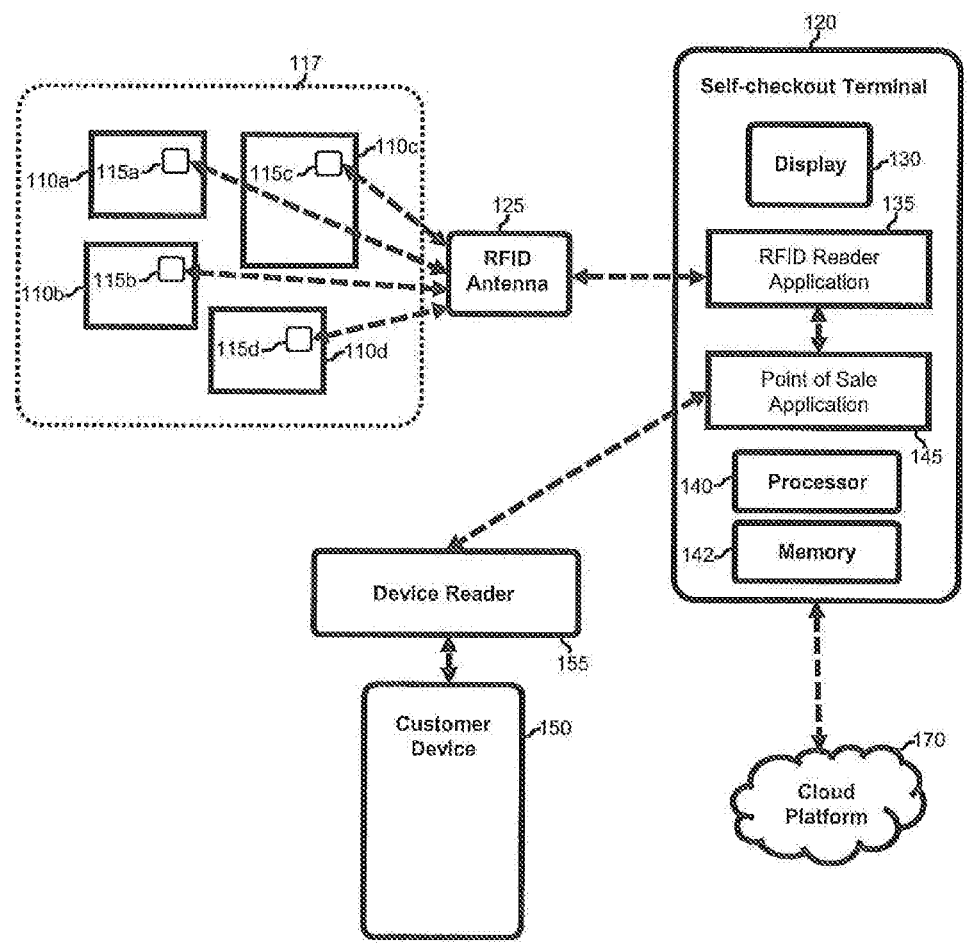
FIG. 1 is a block diagram depicting aspects of an embodiment of the present invention.

Aspects of the embodiments described herein provide a portable device, and a customer device payment application that runs on the portable device (e.g. mobile phone/cellphone, smart watch, tablet computer etc.), of a retail customer or device user. The customer device payment application uses the device's built-in magnetic field sensors and data transceivers to interact with a physical reader that is associated with a physical point-of-sale location.

The reader contains an electromagnetic magnetic field emitting component, coupled with a component for sending/receiving data to the portable device (e.g. a wireless beacon). By limiting the range of the magnetic field to within, for example, 5 cm, the application is able to detect the customer's intent to pay through a touch or 'tap' gesture against the reader.

The matching of the data from the reader with the correct user account and the correct physical point-of-sale terminal may be done via a cloud computing infrastructure (i.e. via a cloud platform), and following the 'tap' against the reader, the customer has the payment confirmation and receipt data sent to the customer device payment application, and is able to leave the point-of-sale location with their purchases.

There is a potential security problem with NFC based payments. Because payment through NFC requires data to be passed from the customer's device or payment card to the NFC reader, it is possible for readers in stores to be tampered with or replaced with identical units that thieves use to collect data from the user's payment card or NFC device, without the store or user having any knowledge of the theft.

Requiring them to pay with NFC also leaves customers vulnerable to malicious use of NFC devices, whereby thieves can place a NFC payment reader near the user's wallet (e.g. placing the reader near a person's back pocket while they are standing in a queue) to take unintended payments due to the lack of authorization needed for NFC payments by card.

In aspects of the embodiments described herein, no data about the customer is ever passed to the point-of-sale equipment. Everything remains in the cloud platform where it can't be physically accessed, and where it can be securely protected (e.g. by data encryption etc.).

There is a further problem in the potential security vulnerability in methods which use optical scanning for customer identification and for payment for purchases. Matrix barcodes can be removed and replaced, and images generated on the customer's device via an application are vulnerable to theft via screenshots and other copying methods.

Aspects of the embodiments described herein provide no physically visible identification on the device display. This means there isn't anything to copy or mimic. The unique data from the reader is received by the application and sent to be matched securely in the cloud platform. The point-of-sale location or application is never sent the identity of the user but only confirmation that the items have been paid for and that the items can be removed from the point-of-sale's inventory.

Aspects of the embodiments described herein provide a secure tap-enabled payment mechanism that can work across all smart devices. In current devices using a proprietary intermediary payment provider mechanism there may be no options for customers to pay securely through a tap gesture without using the proprietary intermediary payment provider. If this provider doesn't store detailed receipt data, the incentive to pay through this provider using the only gesture enabled payment method available is greatly diminished when the user requires an itemized receipt (e.g. in case of needing to return items). This means the user is more likely to choose NFC payment by card and request a paper receipt from the point of sale. This is both slower and less convenient from a record keeping perspective and opens the customer to the security vulnerabilities already described regarding NFC card payments.

FIG. 1 depicts an embodiment of the present invention. A retail environment comprising the embodiment includes items available for purchase. Each item comprises a radio-frequency identification (RFID) tag which may be a passive RFID tag. An RFID tag may be attached to item packaging, or to any suitable location on the item which is accessible to radio-frequency (RF) signals. The retail environment may comprise a point-of-sale checkout terminal, which may be a point-of-sale self-checkout terminal or kiosk 120. A customer in the retail environment selects items for purchase, items 110a-110d illustrated. Items 110a-110d each comprise an attached RFID tag, 115a-115d respectively. The customer takes the selected items to a checkout terminal, for example self-checkout terminal 120. Self-checkout terminal 120 comprises RFID antenna 125 operable for sending to and receiving from RFID tags 115a-115d RF signals. Terminal 120 may have a designated purchase area for deposit by the customer of selected items for purchase, and RFID antenna 125 typically has a short range so as to communicate only with items within the designated purchase area. Other arrangements may be possible, for example the customer may position a shopping basket or a mobile shopping trolley containing selected items for purchase adjacent RFID antenna 125. RF signals received from tags 115a-115d identify items 110a-110d respectively to terminal 120 and indicia representing each identified item may be displayed to the customer on optional display 130 of terminal 120. Terminal 120 may comprise computer processing capacity comprising one or more processors 140, and may comprise one or more memories 142. Selected items 110a-110d together comprise customer order 117. Terminal 120 may communicate data on customer order 117 comprising items 110a-110d selected for purchase to a payment system, for example a payment system on cloud platform 170.

RFID antenna 125 is in signal communication with terminal 120. This communication may be by wired or wireless communication as convenient for the location. Terminal 120 comprises RFID antenna communication software and/or hardware, preferably comprising RFID reader application 135. RFID reader application 135 is operable for communicating with other operating functionality of terminal 120 comprising point-of-sale application 145. Point-of-sale application 145 is operable for signal communicating with customer device reader 155. This communication may be by wired or wireless communication as convenient for the location. Customer device reader 155 is operable for signal communicating with customer device 150.

Figure 2:
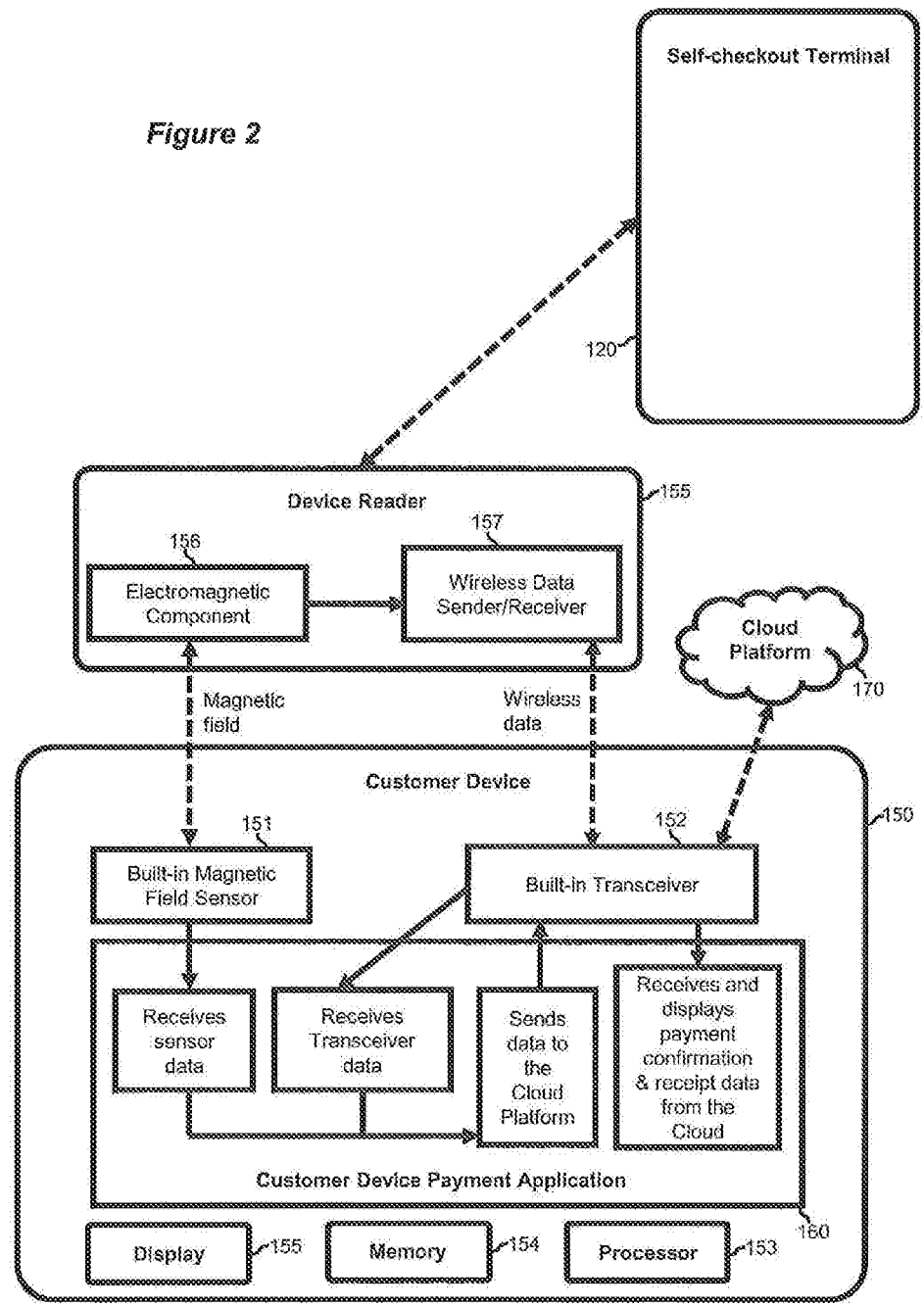
FIGS. 2 and 3 are block diagrams depicting further aspects of an embodiment of the present invention.

FIG. 2 depicts an embodiment of the present invention and illustrates in more detail interaction between device reader 155 and customer device 150. Device reader 155 comprises an electromagnetic component 156 and a wireless data sender/receiver 157. Customer device 150 comprises one or more built-in magnetic field sensors 151, one or more built-in wireless transceivers 152, one or more processors 153, one or more memories 154, and may comprise display 155. Device reader 155 and its association with self-checkout terminal 120 has a unique identifier communicable to customer device 150. This unique identifier may be for example a numeric or alphanumeric code.

A customer may use their customer device 150 to process purchase of selected items 110a-110d. Customer device 150 comprises customer device payment application 160. Customer device payment application 160 is associated with a customer payment system with which the customer must be registered to process the payment using the payment system service. The customer payment system may comprise functionality provided as a service on a cloud platform 170, but it will be understood that other network-accessible means of service delivery may be used without departing from the scope of the invention. Typically the customer connects to the payment system by, for example, logging in to an account using a unique customer identifier and password. This may be accomplished manually or automatically using customer credentials stored in customer device 150.

Device reader 155 is operable for short range wireless communication with customer device 150. Electromagnetic component 156 is operable for producing a continuous magnetic field and for monitoring for any close-range interactions with this field. Wireless data sender/receiver 157 is operable for wireless data communication with customer device 150.

To initiate the customer part of the payment process, the customer positions customer device 150 close enough to device reader 155 for customer device 150 magnetic field sensor 151 to interact with the magnetic field produced by electromagnetic component 156 of device reader 155. This may be termed a touch or 'tap' interaction, although it will be understood that customer device 150 does not need to physically touch device reader 155 for the customer part of the payment process to be initiated. Close proximity is sufficient. Two events occur as a result, which may occur simultaneously but not necessarily so. Customer device payment application 160 on customer device 150 receives data on interaction with the magnetic field from magnetic field sensor 151. Electromagnetic component 156 of device reader 155 detects initial interaction from customer device 150 and sends data to device reader wireless data sender/receiver 157.

Device reader wireless data sender/receiver 157 wirelessly sends device reader unique identifier to customer device 150 which receives it via a built-in transceiver 152. This wireless communication may be by any suitable wireless means. For example, it may utilize a short-range wireless protocol such as NFC or Bluetooth (Bluetooth is a trademark of Bluetooth Special Interest Group). Customer device payment application 160 on customer device 150 receives this data from built-in transceiver 152.

Customer device payment application 160 sends received data from its built-in magnetic field sensor 151 and received data from built-in transceiver 152 including device reader 155 unique identifier as reader identifying data to the payment system on cloud platform 170. This may be via wireless communication, for example using 3G or 4G wireless technology. The payment system on cloud platform 170 verifies this data and matches it with data received from terminal 120 comprising data on customer order 117 and which includes the unique identifier associated with device reader 155 and terminal 120. Payment system on cloud platform 170 processes the payment and sends payment confirmation and receipt data to customer device transceiver 152. Customer device payment application 160 receives this payment confirmation and receipt data and may store this and optionally display on display 155.

Figure 3:
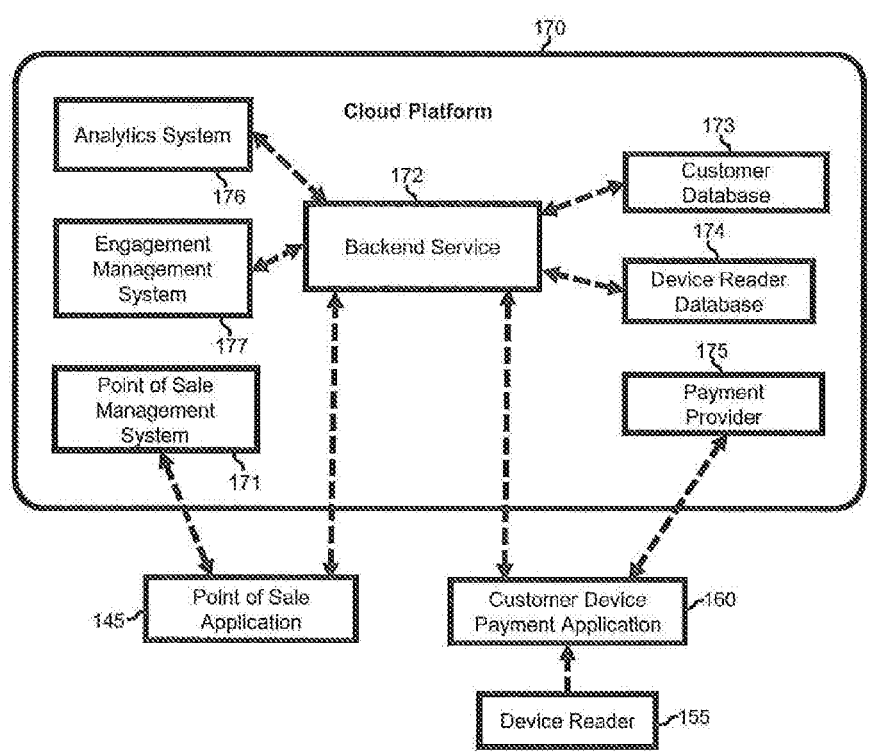

FIG. 3 depicts an embodiment of the present invention and illustrates in more detail interaction between terminal 120, customer device 150, and cloud platform 170. Cloud platform 170 may comprise a payment system which comprises one or more of the following components: backend service 172; customer database 173; device reader database 174; payment provider 175; and point-of-sale management system 171. The identification of individual components as illustrated is for convenience of description. It will be apparent that other arrangements may be envisaged without departing from the scope of the invention. For example, two or more components may be combined, or a component separated into more than one component. Components may also be situated separately from the cloud platform and not as illustrated.

Backend service 172 of cloud platform 170 provides a coordination function. Backend service 172 receives from customer device payment application 160 of customer device 150 data including: device reader 155 identifying data, for example including device reader unique identifier, and sensor data, for example magnetic field signature, which may comprise measurements of the magnetic field for all three physical axes, i.e. x, y, and z axes, as reader identifying data. Backend service 172 also receives customer credentials, for example username and password.

Sensor data collected by the customer device payment application 160 of customer device 150 is sent to backend service 172. Backend service 172 may compare this with known data for device reader 155 and/or the physical location itself (e.g. the retail store location). This may provide an optional additional security measure for verifying the location and customer identification. For example, as the customer walks around the store, customer device payment application 160 may receive and send magnetic field readings via the customer device 150 sensors to backend service 172.

Backend service 172 may combine this data with magnetic sensor data sent from devices of other customers also comprising a customer device payment application 160 and in the same physical location. Backend service 172 may use these magnetic field readings to produce a unique 'map' of the location using the Earth's magnetic field and any physical objects in the structure that can interact/interfere with that field (e.g. steel, iron, sources of electricity and magnetism etc.). Cloud platform 170 may store the magnetic field readings mapped to a specific location in the physical environment, as well as the known range of magnetic field strength for device reader 155, and backend service 172 may compare them against any new data received from customer device payment application 160 for the purpose of triggering alerts when the data received is outside expected ranges.

Backend service 172 of cloud platform 170 receives from point-of-sale application 145 of terminal 120: data relating to customer order 117 comprising items 110a-110d selected for purchase; and device reader 155 identifying data.

Backend service 172 matches customer credentials with customer database 173. Backend service 172 matches device reader 155 identifying data received from customer device payment application 160 to device reader database 174. It uses sensor data (e.g. measurements of the magnetic field for all three physical axes, i.e. x, y, and z axes) received from customer device payment application 160 to verify the correct point-of-sale terminal 120 identifier data. It may do this by comparing with a known data set compiled from data from customer device payment application 160 of a number of customer devices for that specific location (i.e. 'crowdsourced' data), and/or data from device reader 155, with new data sent by customer device payment application 160.

Backend service 172 uses the verified correct point-of-sale terminal identifier data to retrieve data about customer order 117 from point-of-sale application 145 of terminal 120. It then sends the retrieved order 117 data to payment provider 175 via customer device application 160. Payment provider 175 then executes the payment process. This may involve reconciliation with a customer account or access to a customer bank account provider. Backend service 172 receives payment confirmation via customer device payment application 160 and sends receipt data to customer device application 160 which confirms payment to the customer. Optionally, customer device display 155 may display receipt data to the customer.

Backend service 172 sends a confirmation message of payment completion to terminal 120. Terminal 120 receives the confirmation and displays confirmation of payment completion. The customer may now remove their purchased items 110a-110d.

Cloud platform 170 may comprise point-of-sale management system 171. Point of sale application 145 is operable for communicating transaction data relating to processed orders (sales) to point-of-sale management system 171 for such purposes as stock control. It will be apparent that point-of-sale management system 171 may be provided as part of a separate system to cloud platform 170. For example, point-of-sale management system 171 may comprise part of a retail store company's systems, and other parts of the payment system may be provided by a payment system provider using cloud platform 170.

In some embodiments, analytics system 176 receives and analyses data from customer device payment application 160, as well as data from other sources (e.g. weather data etc.), via backend service 172. These other data sources may be part of cloud platform 170 or external to it. Analytics system 176 sends alerts to engagement management system 177 when it detects useful data, patterns and anomalies.

Engagement management system 177 may complete actions via backend service 172 that are triggered manually (e.g. by the system user etc.), in response to alerts from analytics system 176, as well as automatically (e.g. using rules, machine learning, and other automation processes etc.). Engagement management system 177 sends actions to customer device payment application 160 and/or to terminal 120 via backend service 172. Customer device payment application 160 displays actions from engagement management system 177 via customer device 150 (e.g. sound, vibration etc.), device display 155 (e.g. using push notification, in-application alert, text message etc.) and/or to store in device memory 154. Terminal 120 displays actions from engagement management system 177 on display 130 via point of sale application 145.

Engagement management system 177 may function to encourage and discourage particular purchases and behaviors from customers using customer device application 160. It does so in conjunction with backend service 172 to prevent actions from reaching customers who are unable to act due to external factors (e.g. low stock levels of particular products at the customer's nearest store location etc.).

For example, analytics system 176 detects a particular behavior in a subset of customers at multiple stores currently using customer device payment application 160 to pay for items from the same product category as item 110*a*. Analytics system 176 sends an alert to engagement management system 177, which matches the alert to a corresponding action, for example "offer those customers a discount on products from the same category as item 110*b*". Engagement management system 176 sends a stock-check request via backend service 172 to point of sale management system 171 to verify stock volumes at the specific stores where the customers are currently located. Point of sale management system 171 confirms stock levels of products from the same product category as item 110*b* at the correct stores. Engagement management system 177 sends an offer for products from the same category as item 110*b* to the correct customers via customer device application 160, but only to the customers currently in stores where item 110*b* products are confirmed to be in-stock. The message displays to those customers on device display 155, telling them they can buy item 110*b* category products at a discounted price if they complete their purchase within a specified limited time (e.g. 10 minutes from receiving the offer).

Figure 4:
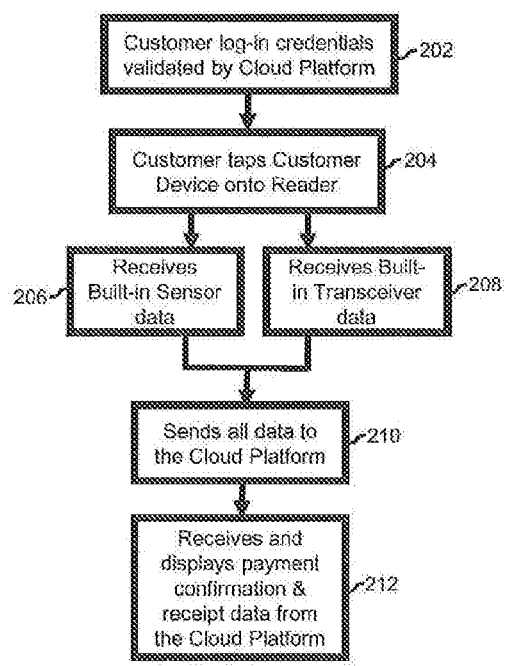
FIG. 4 is a flowchart depicting aspects of an embodiment of the present invention.

FIG. 4 depicts a flowchart which details operation of aspects of the payment process at the customer device payment application 160. To use the payment process, the customer connects to the backend service 172 of the payment system cloud platform 170 by, for example, logging in with user identifier and password (user credentials). Customer device payment application 160 receives 202 notification that cloud platform 170 has verified user credentials.

The customer now starts 204 the payment process by 'tap' of customer device 150 to device reader 155. Customer device payment application 160 receives 206 data on interaction with the magnetic field of electromagnetic component 156 of device reader 155 from customer device built-in magnetic field sensor 151. Customer device payment application 160 also receives 208 device reader unique identifier from built-in transceiver 152 which the transceiver has received from wireless data sender/receiver 157 of device reader 155. Actions 206 and 208 may take place simultaneously or substantially simultaneously, but need not necessarily do so.

Customer device payment application 160 sends 210 data from 206 and 208 to cloud platform 170. Customer device payment application 160 receives 212 from cloud platform 170 payment completion confirmation and may also receive receipt data detailing individual purchased item data. Optionally, display 140 of customer device 150 may display receipt data to the customer.

Figure 5:
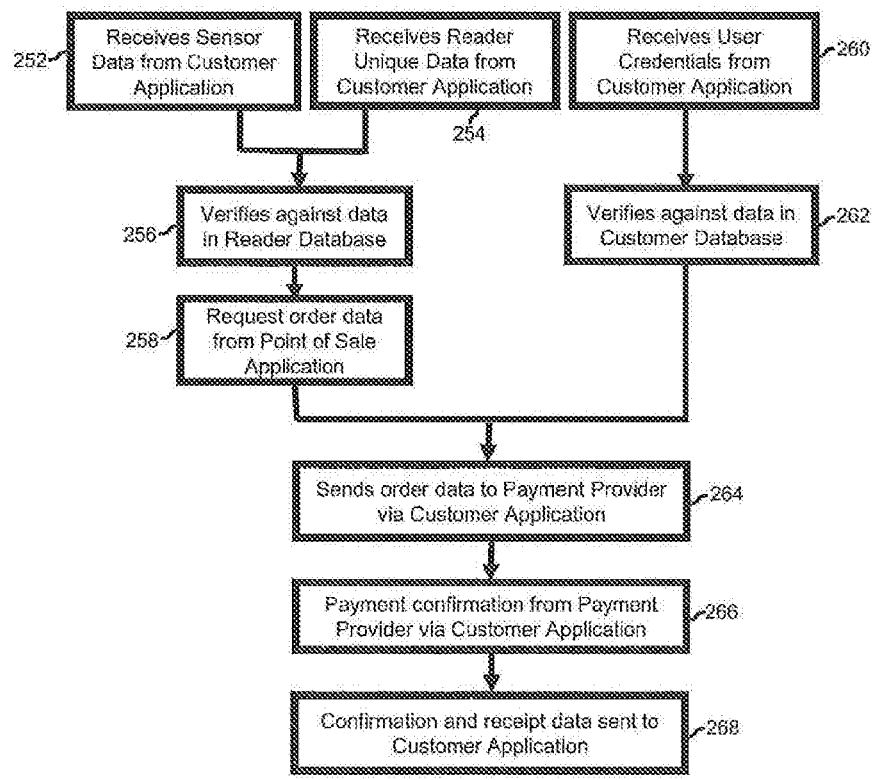
FIG. 5 is a flowchart depicting further aspects of an embodiment of the present invention.

FIG. 5 depicts a flowchart which details operation of aspects of the payment process at cloud platform 170. Backend service 172 of cloud platform 170 receives 260 customer credentials from customer device payment application 160. It verifies 262 received customer credentials against data in customer database 173 and communicates this to customer device payment application 160.

Backend service 172 of cloud platform 170 receives 252 data from customer device built-in magnetic field sensor 151 and receives 254 device reader unique identifier from customer device built-in transceiver 152. It verifies 256 this received data against data in the device reader database 174. It requests 258 order data from the identified point-of-sale application 145 of terminal 120.

Backend service 172 of cloud platform 170 sends 264 received order data to payment provider 175 via customer device payment application 160. It then receives 266 payment confirmation from payment provider 175 via customer device payment application 160. Backend service 172 then sends payment confirmation and receipt data to customer device payment application 160.

Figure 6:
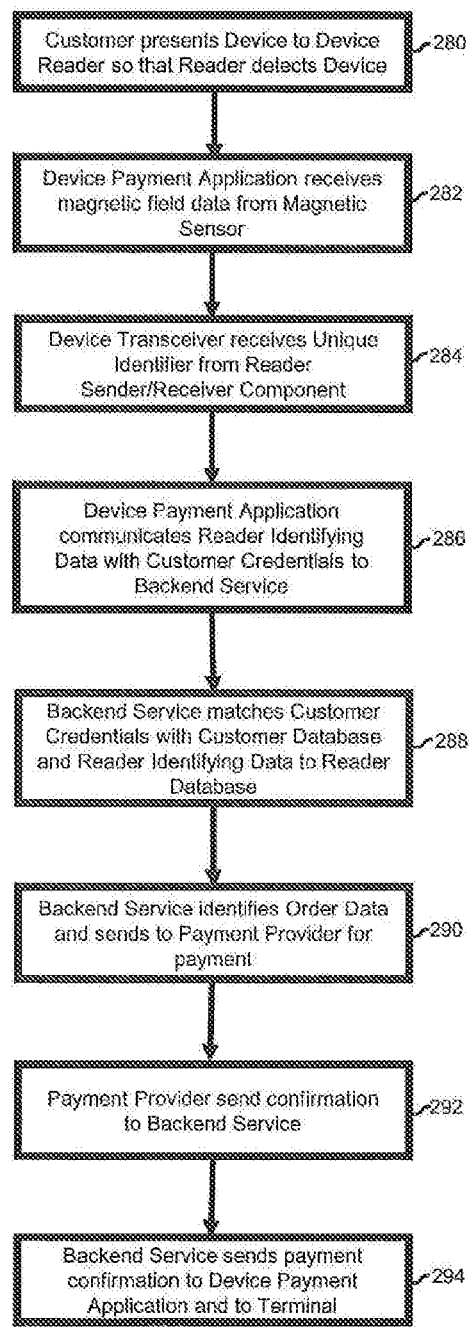
FIG. 6 is a flowchart depicting further aspects of an embodiment of the present invention.

FIG. 6 depicts a flowchart showing the working of the payment system in accordance with an embodiment of the present invention. The customer presents 280 device 150 to device reader 155 so that device reader 155 detects device 150. Device payment application 160 receives 282 magnetic field data from device built-in magnetic sensor 151. Device transceiver 152 receives 284 reader unique identifier from device reader 155. Device payment application 160 communicates 286 reader identifying data with customer credentials to the backend service 172. The backend service 172 matches 288 customer credentials with customer database 173 and reader identifying data to reader database 174. The backend service uses the verified reader identification to identify 290 the correct order data and sends it to payment provider 175 for executing payment. This may be via device payment application 160.

Payment provider 175 may send 292 confirmation to backend server 172 which may be via device payment application 160. Backend service 172 may send 294 payment confirmation to device payment application 160 and to terminal 120.

It will be apparent that the described payment process does not require a self-checkout terminal using RFID identification of items selected by a customer for purchase. It may be implemented in other retail environments with other means of identifying items selected for purchase by a customer, for example reading barcodes from items.

Figure 7:
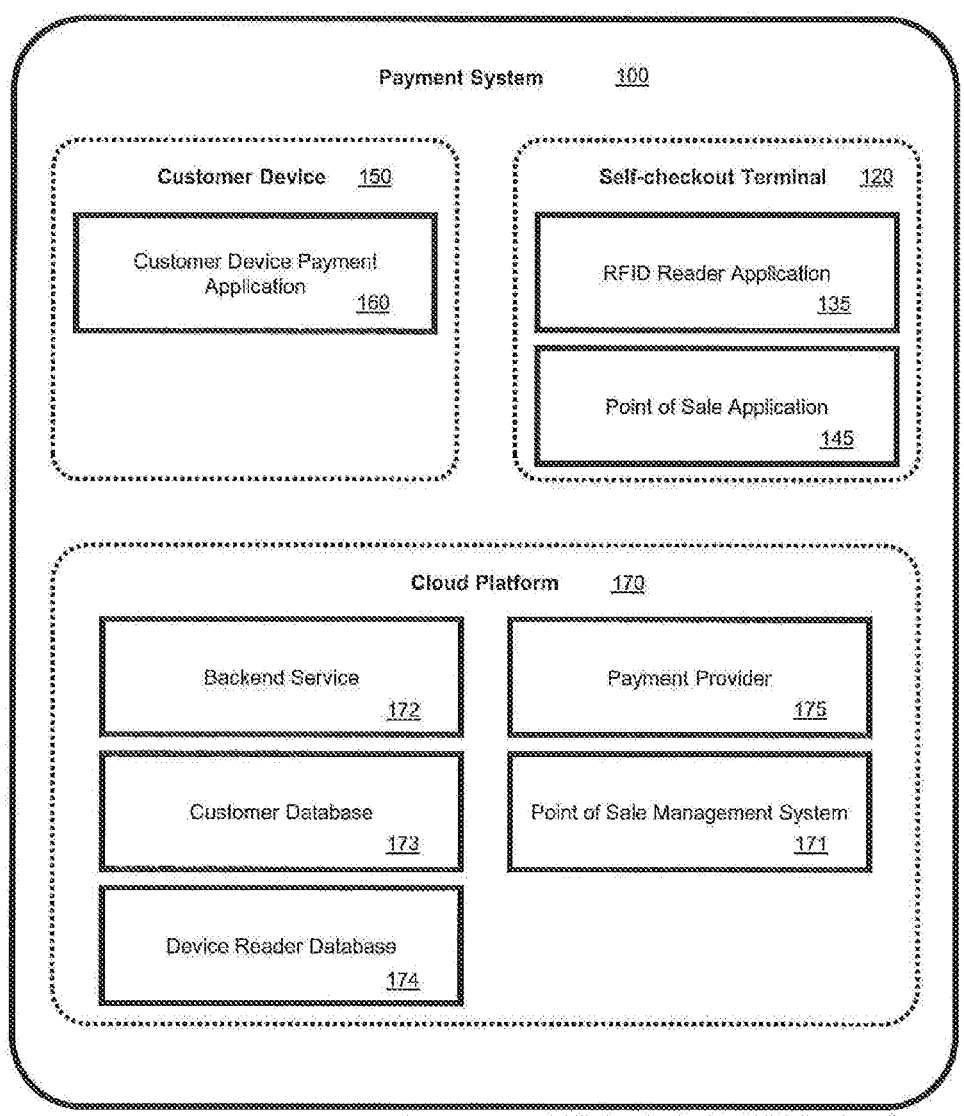
FIG. 7 is block diagram depicting the components of a system according to an embodiment of the present invention.

FIG. 7 depicts a block diagram of components of a payment system 100 in accordance with an embodiment of the present invention. Components may be provided as software applications, but may also include hardware implementations in whole or in part without departing from the scope of the present invention. For ease of description, however, a software implementation comprising software applications will be described. Payment system 100 comprises components having functionality which may execute on one or more of terminal 120, customer device 150, cloud platform 170.

Terminal 120 comprises RFID reader application 135 and point-of-sale application 145. RFID reader application 135 comprises functionality for communicating with other operating functionality of terminal 120 comprising point-of-sale application 145. Point-of-sale application 145 comprises functionality for signal communicating with customer device reader 155.

Customer device 150 comprises customer device payment application 160. Customer device payment application 160 may comprise functionality for allowing a customer to register with backend service 172 of payment system 100. Customer device payment application 160 comprises functionality for receiving data on interaction with the magnetic field from magnetic field sensor 151. Customer device payment application 160 also comprises functionality for receiving data from built-in transceiver 152. Customer device payment application 160 comprises functionality for sending the received data, including device reader 155 unique identifier, to the backend service 172 of payment system on cloud platform 170. Customer device payment application 160 comprises functionality for receiving payment confirmation and receipt data from backend service 172 of cloud platform 170. Customer device payment application 160 may also comprise functionality for sending order transaction data to point-of-sale management system 171, and point-of-sale management system 171 may contain functionality for receiving this data.

Cloud platform 170 may comprise one or more of the following components: backend service 172; customer database 173; device reader database 174; payment provider 175; and point-of-sale management system 171.

Backend service 172 comprises coordinating functionality. Backend service 172 may comprise functionality for receiving customer registration information from customer device payment application 160. Backend service 172 comprises functionality for receiving from customer device payment application 160 data including: device reader 155 identifying data (e.g. including device reader unique identifier); customer credentials (e.g. username and password); and sensor data (e.g. magnetic signature data). Backend service 172 also comprises functionality for matching customer credentials data with customer database 173, and for matching to device reader database 174 device reader identifying data received from customer device payment application 160. Backend service 172 also comprises functionality for retrieving order data from point-of-sale application 145.

Backend service 172 also comprises functionality for sending order data to and receiving payment confirmation data from payment provider 175 via customer device payment application 160. Backend service 172 also comprises functionality for sending payment confirmation and receipt data to customer device payment application 160, and payment confirmation to point-of-sale application 145.

Payment provider 175 comprises functionality for receiving data relating to payments from backend service 172 via customer device payment application 160, and for returning payment confirmation.

Point-of-sale management system 171 may be present on cloud platform 170. It may comprise functionality for receiving order data from point-of-sale application 145 of terminal 120. It may use this data for stock control and other sales management purposes.

Figure 8:
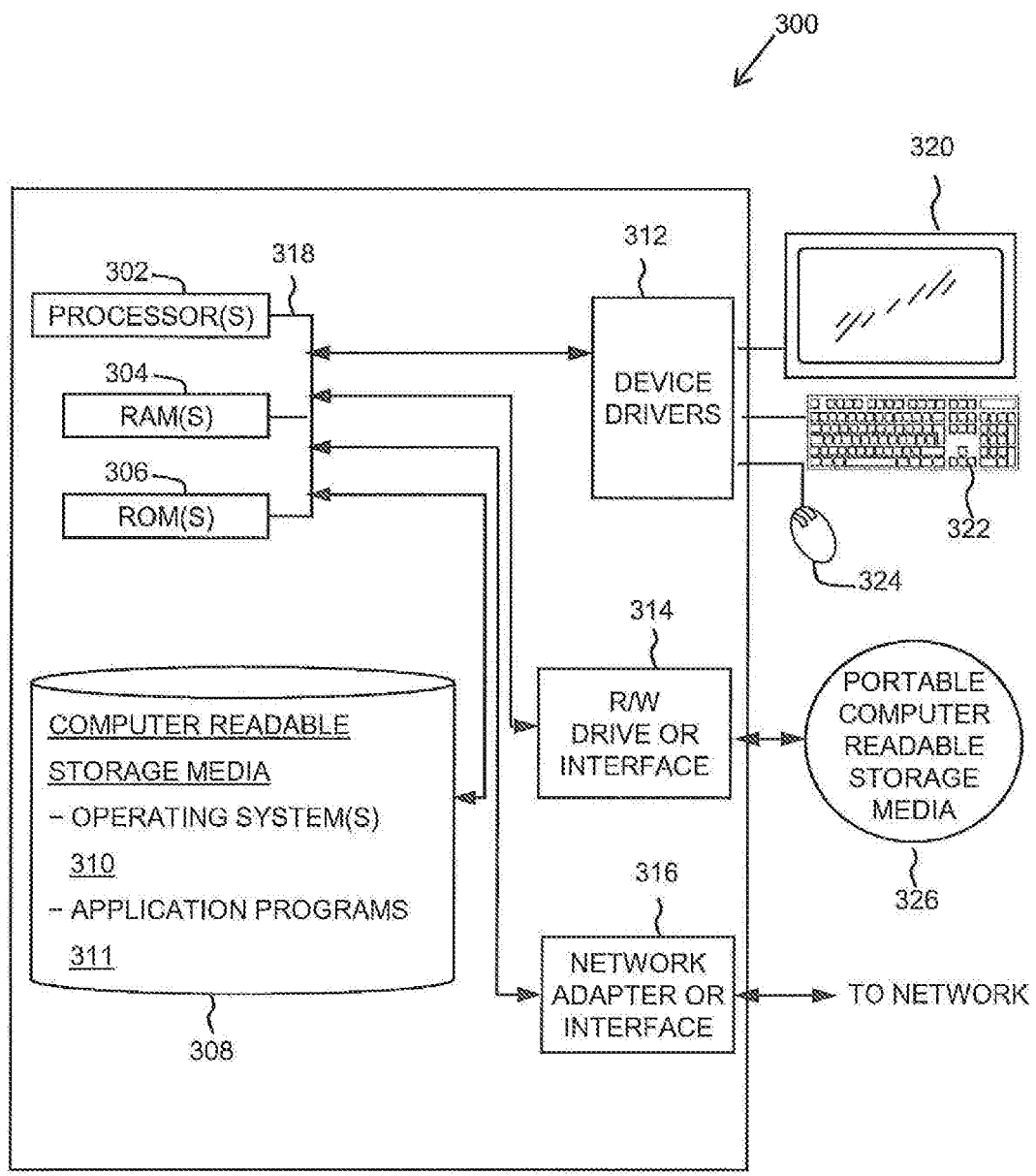
FIG. 8 is a block diagram depicting a device suitable for implementing an embodiment of the present invention.

FIG. 8 depicts a block diagram of components of a computing device 300 such as a customer device including the customer device payment application functionality described herein, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing device 300 can include one or more processors 302, one or more computer-readable RAMs 304, one or more computer-readable ROMs 306, one or more computer readable storage media 308, device drivers 312, read/write drive or interface 314, and network adapter or interface 316, all interconnected over a communications fabric 318. Communications fabric 318 can be implemented with any architecture designed for passing data and/or control information between processors (such as microprocessors, communications and network processors, etc.), system memory, peripheral devices, and any other hardware components within the system.

One or more operating systems 310, and application programs 311, such as a customer device payment application, are stored on one or more of the computer readable storage media 308 for execution by one or more of the processors 302 via one or more of the respective RAMs 306 (which typically include cache memory). In the illustrated embodiment, each of the computer readable storage media 308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 300 can also include a R/W drive or interface 314 to read from and write to one or more portable computer readable storage media 326. Application programs 311 on computing device 300 can be stored on one or more of the portable computer readable storage media 326, read via the respective R/W drive or interface 314 and loaded into the respective computer readable storage media 308.

Computing device 300 can also include a network adapter or interface 316, such as a TCP/IP adapter card or wireless communication adapter. Application programs 311 on computing device 300 can be downloaded to the computing device from an external computer or external storage device via a network (for example, the Internet, a local area network or other wide area networks or wireless networks) and network adapter or interface 316. From the network adapter or interface 316, the programs may be loaded into the computer readable storage media 308. The network may comprise copper wires, optical fibers, wireless transmission, routers, firewalls, switches, gateway computers and edge servers.

Computing device 300 can also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314, and network adapter or interface 316 can comprise hardware and software stored in computer readable storage media 308 and/or ROM 306.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
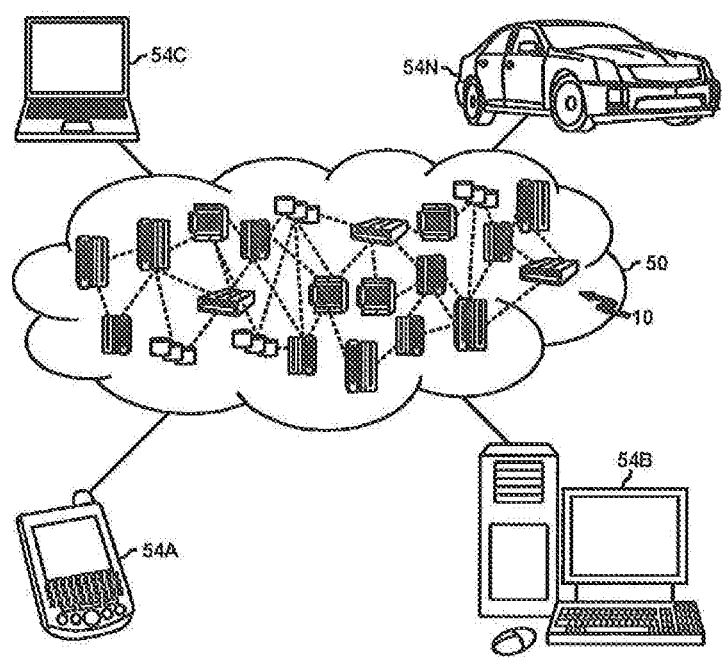
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 10:
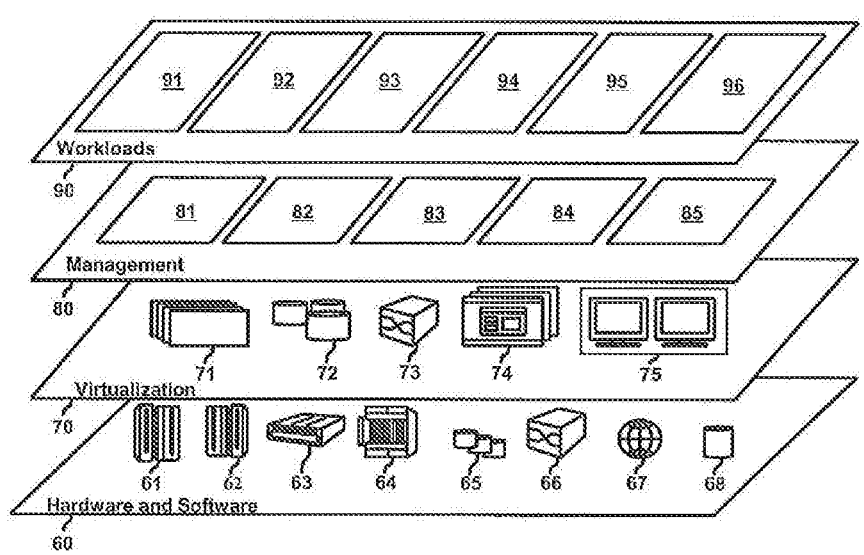
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and payment system cloud platform 96.

The invention claimed is:

1. A method comprising:
receiving credentials of a user from an electronic communications device;
verifying the received credentials against data in a customer database;
receiving, from the electronic communications device, device reader identifying data associated with a device reader, the device reader identifying data comprising a unique identifier for the device reader and magnetic signatures of magnetic fields detected by the electronic communications device while in proximity to the device reader;
verifying the device reader identifying data against data in a device reader database,
wherein the data in the device reader database includes magnetic sensor data crowdsourced from a plurality of electronic communication devices that, when at a physical location of the device reader, obtain a first magnetic field reading associated with the device reader and a second magnetic field reading associated with the physical location of the device reader, and provide the first magnetic field reading and the second magnetic field reading for storing as the magnetic sensor data in the device reader database, and
wherein the magnetic signatures received from the electronic communications device include magnetic field readings associated with the device reader and the physical location of the device reader, and the magnetic signatures are compared to the magnetic sensor data in the device reader database to verify proximity of the electronic communications device to the device reader;
receiving, based on the verified device reader identifying data, order data from a terminal comprising the device reader, wherein neither the terminal nor the device reader obtains an identity of the user; and
communicating, to the electronic communications device, the order data to allow the electronic communications device to send the order data to a payment provider.

2. The method of claim 1, further comprising:
receiving, via the electronic communications device, payment confirmation data from the payment provider; and
communicating receipt data to the electronic communications device for display on a display of the electronic communications device.

3. The method of claim 1, wherein the magnetic signatures comprise measurements of the first and second magnetic fields for three physical axes, the measurements made by a magnetic field sensor in the electronic communications device.

4. A computer program product comprising a computer readable storage medium having a computer readable program stored therein, wherein the computer readable program when executed by a processor, causes the processor to:
receive credentials from an electronic communications device;
verify the received credentials against data in a customer database;
receive, from the electronic communications device, device reader identifying data associated with a device reader, the device reader identifying data comprising a unique identifier for the device reader and magnetic signatures of magnetic fields detected by the electronic communications device when in proximity to the device reader;
verify the device reader identifying data against data in a device reader database,
wherein the data in the device reader database includes magnetic sensor data by crowdsourced from a plurality of electronic communication devices that, when at a physical location of the device reader, obtain a first magnetic field reading associated with the device reader and a second magnetic field reading associated with the physical location of the device reader, and provide the first magnetic field reading and the second magnetic field reading for storing as the magnetic sensor data in the device reader database, and
wherein the magnetic signatures received from the electronic communications device include magnetic field readings associated with the device reader and the physical location of the device reader, and the magnetic signatures are compared to the magnetic sensor data in the device reader database to verify proximity of the electronic communications device to the device reader;
receive, based on the device reader identifying data, order data from a terminal comprising the device reader, wherein neither the terminal nor the device reader obtains an identity of a user; and communicate, to the electronic communications device, the order data to allow the electronic communications device to send the order data to a payment provider.

5. The computer program product of claim 4, wherein the computer readable program is further configured to cause the processor to: receive, via the electronic communications device, payment confirmation data from the payment provider; and communicate receipt data to the electronic communications device for display on a display of the electronic communications device.

6. The computer program product of claim 4, wherein the magnetic signatures comprise measurements of the magnetic fields for three physical axes, the measurements made by a magnetic field sensor in the electronic communications device.

* * * * *